Sept. 19, 1939. T. W. BRYANT Re. 21,206

AUTOMATIC IGNITION CONTROLLER FOR INTERNAL COMBUSTION ENGINES

Original Filed Dec. 19, 1935

Inventor

Thomas W. Bryant,

By Christian R. Nielsen.

Attorney

Reissued Sept. 19, 1939

Re. 21,206

UNITED STATES PATENT OFFICE 21,206

AUTOMATIC IGNITION CONTROLLER FOR INTERNAL COMBUSTION ENGINES

Thomas W. Bryant, Denver, Colo., assignor of fifty-one one-hundredths to E. S. Kassler, Jr., Denver, Colo., and forty-nine one hundredths to C. Herman Huntzinger, Anderson, Ind.

Original No. 2,096,158, dated October 19, 1937, Serial No. 55,282, December 19, 1935. Application for reissue April 14, 1938, Serial No. 202,037

3 Claims. (Cl. 123—117)

This invention relates to ignition timers for internal combustion engines and more particularly to automatic means for controlling the spark in the cylinders of the engine, and it consists in the constructions, arrangements and combinations herein described and claimed.

It is an object of the invention to provide a regulator which will be actuated by the velocity of the fuel and air in the motor intake conduit between the carburetor and the throttle valve, the spark occurrence in the cylinders being advanced or retarded according to such velocity in contra-distinction from being controlled only by motor speed or direct suction or vacuous condition in the intake manifold or at the throttle valve as in other devices.

The present invention is an improvement over the United States patent to Guy B. Stone, Patent No. 1,338,336, particularly in that in my construction I have avoided the need for rotating the cam member independently of the rotation of the timer shaft to effect the point of break, this being taken care of by the use of a novel form of cam and rubbing block.

It is a still further object of the invention to provide a controller mechanism which may be readily installed in ignition systems of present day structures.

Additional objects, advantages and features of invention will be apparent from the following description considered in conjunction with the accompanying drawing, wherein, Figure 1 is a sectional view of my controller with an updraft type of carburetor;

Figure 1:
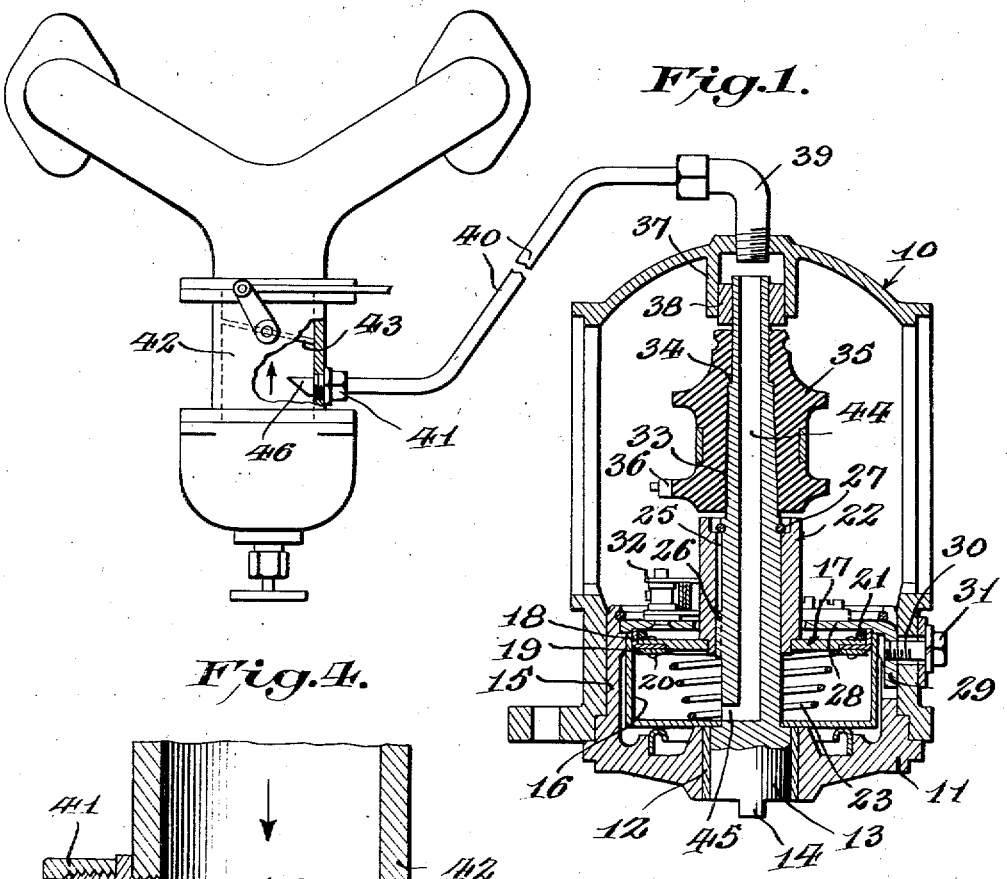
Figure 4:
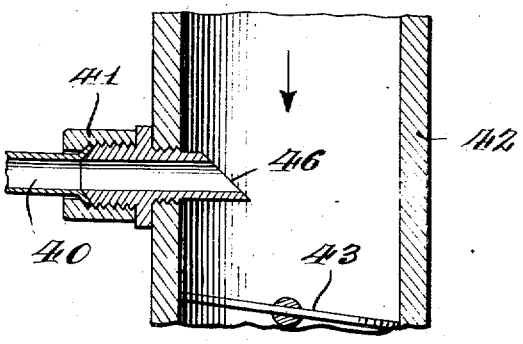
Figure 4 is an enlarged detail view illustrating the connection of the controller when used with a downdraft carburetor.
Figure 2:
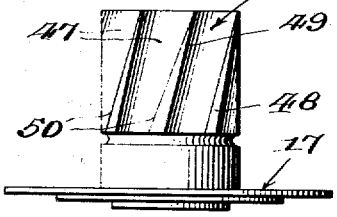
Figure 2 is a side elevation of a cam employed in conjunction with the controller.
Figure 3:
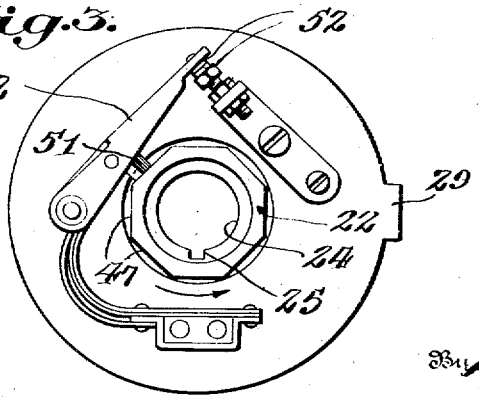
Figure 3 is a top plan view of my assembly, illustrating the cam and breaker points.

In carrying out my invention which in its present embodiment is constructed for use with the ignition system of the present day Ford V-8, I make use of the distributor shell 10, which includes the base plate 11, the latter, as is customary, being centrally apertured as at 12 and receives therethrough a timer shaft 13 the lower end of which is provided with a key 14 for connection with a cam or other shaft for effecting rotation of the timer shaft.

The base plate 11 includes a cylindrical upstanding wall 15 within which there is rotatably seated a cylinder 16. The cylinder 16 is open upon its upper end, its base being centrally apertured to admit the timer shaft 13 for rigid securement therein. A piston 17 is reciprocably mounted in the cylinder 16, and comprises a packing 18 contacting the walls of the cylinder 16 for establishing a proper air-tight fit. The packing 18 in the present instance, is shown as a circular flat disk, the inner periphery of which is disposed in a suitable rabbet formed upon the underside of the piston 17. A flat metallic rim 19 is positioned upon the disk 18 and rivets 20 passed through the ring, the packing disk and piston, secure the packing in the piston. The outer free portion of the disk is bent to lie in a plane parallel with the walls of the cylinder 16, and preferably I employ a split spring ring 21 positioned so as to force the disk into snug engagement with the walls of the cylinder.

The piston 17 has rigidly connected thereto a cam 22, so that the longitudinal movements imparted to the piston will likewise move the cam, as will be explained in greater detail in the description of the operation of the device.

A helical spring 23, is provided, interposed between the under side of the piston 17 and the base of the cylinder 16. The spring 23 is of such strength as to normally hold the piston and its associated cam in its uppermost position, yet compressible to permit downward movement of the cylinder, at times.

The cam 22 has a cylindrical bore 24, in which there is formed a straight keyway 25 extending longitudinally of the bore, into which a key 26 of the timer shaft 13 is disposed. Obviously, from the construction described, the cam 22 is rotatable with the shaft 13, but also has movements longitudinally of the shaft, the key and keyway serving as a guide, the upper limit of movement of the cam being made through contact with a ring 27 removably engaged in a groove formed in the shaft 13.

A removable cover plate 28 is provided for the open end of the upstanding wall 15 and also closes the cylinder 16, and includes a downwardly extended apertured and tapped ear 29 adapted to align with the circumferential slot 30 of the shell 10. A threaded bolt 31 extends through the slot 30 and engages in the tapped ear 29. By loosening the bolt 31, the plate 28 may be given a rotation within a limited degree, thereby varying the setting of the breaker arm 32 with respect to the cam 22.

The timer shaft 13 is provided with a flattened portion 33 extending from a point above the ring 27 to the shoulder indicated at 34, and a rotor 35 is formed with a bore having a flattened portion corresponding to the portion 33, and when the rotor 34 is engaged with the flattened portions contacting, the rotor will be fixed securely to the shaft 13 for rotation therewith, and due to the length of the contacting faces of the shaft and rotor, looseness or wobble of the rotor during operation is reduced. The rotor includes contact arms 36 co-operable with contacts of a distributor cap (not shown) as is customary.

The casing 10 includes a bushing 37 within which the upper end of the timer shaft 13 is journalled, as at 38, and the casing 10 at a point axial of the shaft 13 is drilled and tapped to receive a pipe fitting 39. A pipe 40 is carried by the fitting 39, the opposite end being connected with a nozzle 41, secured in the tube 42 of the carburetor. The nozzle 41 is preferably located between the carburetor and the throttle valve and at a greater distance lengthwise of the conduit from the axis of the valve than the radius of the valve. Thus the nozzle is outside and beyond the zone of direct suction influence of the intake manifold so that the velocity of the incoming fuel and air mixture is the dominant factor in creating and governing suction in the pipe 40 and the cylinder 16, rather than mere engine speed, of which fuel velocity may or may not be a direct function.

The nozzle 41 is provided with an angular orifice at 46, that is projected into the path of the incoming fuel and air stream in the conduit 42.

The shaft 13 has an axial bore 44 extending throughout the length of the shaft, the upper end being open to the fitting 39, while at the lower end a port 45 is provided opening into the cylinder 16. Obviously, then, suction in the bore 44 will cause downward movement of the piston 17 against the tension of the spring 23.

The cam 22 is quite similar to the cam disclosed in my Patent No. 2,096,294, but in the present illustration eight lands 47 are involved, separated by cam faces 48. The cam faces 48 are defined by an inclined leading edge 49, which will vary according to the particular construction of the engine in order to accomplish the proper point of break of the breaker arm 32. The rear edges 50 of the cam faces extend at a slight angle to the leading edge, being inclined in the direction of the base of the cam. Thus, the upper portions of the cam faces are quite sharp, while the portions adjacent the base of the cam present a considerably wider face, and by this formation of cam faces the proper duration of the time of closed circuit is obtained at low and high speeds of the motor.

In order that wear between the cam faces and the wiper block 51 may be reduced to a minimum, the block 51 is positioned upon the breaker arm 32 at an angle approximately that of the leading edge of the cam faces, and as shown in the present instance, the cam will be rotated in a counterclockwise direction. The inclination of the wiper block as shown also insures a more even movement of the breaker arm.

In operation, the plate 28 will be adjusted and fixed circumferentially with respect to the cam, so that the point of break between the points 52 will occur to produce a retarded spark, such as is required in starting a motor, the advance of the spark being automatically taken care of upon starting of the motor as will be understood from the following description.

With the motor operating at idling speed, the throttle valve 43 will be in its closed position and therefore the velocity at 46 is practically low, and the cam 22 will be held in its uppermost position by the spring 23. This position of the cam will produce a retarded spark since the late or retarded portions of the cam faces 48 function to move the arm 32. With movement of the throttle valve 43 to speed up the motor, the suction in the tube 42 of the carburetor is increased, and such suction creates a vacuous condition at the hood 46, creating a suction through the pipe 40, the fitting 39, the bore 44, the port 45 and the cylinder 16, thus drawing the piston 17 downwardly, against the tension of the spring 23. As the suction increases, the downward movement of the piston and associated cam will be correspondingly increased and the advanced or earlier narrow portions of the cam faces 48 thus function to move the breaker arm 32 such as will be required at high speeds of the motor. The degree of advance of the cam is controlled solely by the vacuous condition at 46 created by the velocity of air and fuel flow in the conduit 42, and the tension of the spring 23, and these members will obviously be proportioned according to motor requirements.

The control of spark-timing through the actual velocity of incoming fuel and air provides a superior and accurate automatic timing that eliminates the inaccurate factor of direct suction in the manifold which should not be depended upon solely in determining ignition timing.

While I have shown and described certain preferred forms of the device, I am aware that changes may be made, and I therefore consider as my own, all such modifications as fairly fall within the scope of the appended claims.

What I claim and desire to secure by Letters Patent is:

1. In an ignition controller, a shell, a driven shaft revolubly mounted therein, said shaft having an axial bore and a lateral port adjacent one end thereof, a cylinder connected to the shaft and surrounding the port, a piston reciprocable in the cylinder, a helical spring in the cylinder for holding the piston in one of its extreme movements, a cam fixed to the piston, including inclined tapered cam faces, said cam having an axial bore and slot, a key on the driven shaft slidably engaged in the slot, stop means on the shaft for engaging the cam to limit movement of the cam in one direction, ignition breaker means operatively associated with the cam, and suction means associated with the bore of the shaft for retracting the piston against the action of the spring.

2. In an ignition controller, a shell having bearings at the ends, a driven shaft revolubly mounted therebetween, a conduit opening upon one of the bearings and having communication with a source of suction, said shaft having an axial bore in communication with said bearing and having a lateral port adjacent the other bearing, a cylinder fixed to the shaft, piston means reciprocable in the cylinder, spring means for holding the piston at a normal position, a cam carried by the piston, said cam having elongated inclined cam faces, an ignition breaker arm operatively related to the cam faces, and said cam being connected with the shaft for rotary and longitudinal movement thereon.

3. In an ignition controller, a rotary shaft, a helical circuit breaker mounted for both conjoint rotary movement with the shaft and for relatively non-rotary longitudinal movement along said shaft, and automatic spring-opposed suction mechanism operatively connected with the circuit breaker and adapted to impart such longitudinal movement thereto.

THOMAS W. BRYANT.